US012690068B2

(12) United States Patent
Turtinen et al.

(10) Patent No.: US 12,690,068 B2
(45) Date of Patent: *Jul. 21, 2026

(54) RANDOM ACCESS IN COMMUNICATION SYSTEM

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 93 days.

This patent is subject to a terminal disclaimer.

(21) Appl. No.: 17/797,658

(22) PCT Filed: Feb. 6, 2020

(86) PCT No.: PCT/CN2020/074449
§ 371 (c)(1),
(2) Date: Aug. 4, 2022

(87) PCT Pub. No.: WO2021/155546
PCT Pub. Date: Aug. 12, 2021

(65) Prior Publication Data
US 2023/0070545 A1      Mar. 9, 2023

(51) Int. Cl.
*H04W 4/00*      (2018.01)
*H04W 74/00*      (2009.01)
(Continued)

(52) U.S. Cl.
CPC ..... *H04W 74/0833* (2013.01); *H04W 74/004* (2013.01); *H04W 74/02* (2013.01); *H04W 74/0836* (2024.01); *H04W 74/0838* (2024.01)

(58) Field of Classification Search
CPC ............... H04W 74/004; H04W 74/02; H04W 74/0833; H04W 74/002; H04W 74/04;
(Continued)

(56) References Cited

U.S. PATENT DOCUMENTS

| | | | |
|---|---|---|---|
| 9,301,323 B2 * | 3/2016 | Zhao | ................. H04W 74/0838 |
| 11,991,751 B2 | 5/2024 | Cao et al. | |

(Continued)

FOREIGN PATENT DOCUMENTS

| | | |
|---|---|---|
| CN | 101193421 A | 6/2008 |
| CN | 105636230 A | 6/2016 |

(Continued)

OTHER PUBLICATIONS

Notice of Acceptance for Australian Application No. 2020427793 dated Feb. 12, 2024, 3 pages.

(Continued)

*Primary Examiner* — Liton Miah
(74) *Attorney, Agent, or Firm* — ALSTON & BIRD LLP

(57)      ABSTRACT

Embodiments of the present disclosure relate to random access in a communication system. A first device determines whether a contention-free random access resource is allocated from a second device for a first random access type. In accordance with a determination that the contention-free random access resource is allocated, the first device compares a target transport block size corresponding to the contention-free random access resource with a first transport block size configured for a first group of preambles available for the first random access type, and performs random access to the second device based on a result of the comparison.

20 Claims, 3 Drawing Sheets

(51) Int. Cl.

| | |
|---|---|
| H04W 74/02 | (2009.01) |
| H04W 74/08 | (2024.01) |
| H04W 74/0833 | (2024.01) |
| H04W 74/0836 | (2024.01) |
| H04W 74/0838 | (2024.01) |

(58) Field of Classification Search

CPC ... H04B 17/318; H04B 17/336; H04B 17/382
See application file for complete search history.

(56) References Cited

U.S. PATENT DOCUMENTS

| | | | |
|---|---|---|---|
| 2005/0063330 A1 | 3/2005 | Lee et al. | |
| 2007/0127410 A1 | 6/2007 | Guo et al. | |
| 2008/0080472 A1 | 4/2008 | Bertrand et al. | |
| 2011/0292895 A1 | 12/2011 | Wager et al. | |
| 2012/0044877 A1 | 2/2012 | Ratasuk et al. | |
| 2012/0044878 A1 | 2/2012 | Ratasuk et al. | |
| 2012/0093109 A1 | 4/2012 | Dong et al. | |
| 2012/0182867 A1 | 7/2012 | Farrag et al. | |
| 2013/0058315 A1 | 3/2013 | Feuersanger et al. | |
| 2014/0233528 A1 | 8/2014 | Webb et al. | |
| 2016/0143064 A1 | 5/2016 | Cho et al. | |
| 2016/0174237 A1 | 6/2016 | Zhao et al. | |
| 2017/0118604 A1 | 4/2017 | Kim et al. | |
| 2017/0135134 A1 | 5/2017 | Rune et al. | |
| 2017/0325263 A1 | 11/2017 | Liu et al. | |
| 2018/0139653 A1 | 5/2018 | Lee et al. | |
| 2018/0324653 A1 | 11/2018 | Nagaraja et al. | |
| 2019/0028980 A1 | 1/2019 | Feuersaenger et al. | |
| 2019/0313456 A1 | 10/2019 | Liu et al. | |
| 2019/0320467 A1 | 10/2019 | Freda et al. | |
| 2019/0327762 A1 | 10/2019 | Takeda et al. | |
| 2019/0350011 A1 | 11/2019 | Li et al. | |
| 2019/0364605 A1 | 11/2019 | Loehr et al. | |
| 2020/0163124 A1 | 5/2020 | Da et al. | |
| 2020/0267772 A1 | 8/2020 | Jung et al. | |
| 2020/0275491 A1 | 8/2020 | Ren et al. | |
| 2020/0314664 A1 | 10/2020 | Zhou et al. | |
| 2020/0314913 A1 | 10/2020 | Rastegardoost et al. | |
| 2020/0359426 A1 | 11/2020 | Pan et al. | |
| 2020/0383141 A1 | 12/2020 | Lei et al. | |
| 2021/0028905 A1 | 1/2021 | Lei et al. | |
| 2021/0037589 A1 | 2/2021 | Yoshioka et al. | |
| 2021/0051706 A1 | 2/2021 | Yang et al. | |
| 2021/0058971 A1 | 2/2021 | MolavianJazi et al. | |
| 2021/0076384 A1 | 3/2021 | MolavianJazi et al. | |
| 2021/0100029 A1 | 4/2021 | Lei et al. | |
| 2021/0100034 A1 | 4/2021 | Turtinen et al. | |
| 2021/0144742 A1 | 5/2021 | Jeon et al. | |
| 2021/0227587 A1* | 7/2021 | Tsai | H04W 74/006 |
| 2021/0243814 A1 | 8/2021 | Zhang et al. | |
| 2021/0352744 A1 | 11/2021 | Ma et al. | |
| 2022/0256620 A1* | 8/2022 | Lu | H04W 72/044 |
| 2022/0394776 A1 | 12/2022 | Harrison et al. | |
| 2023/0164844 A1 | 5/2023 | Lei et al. | |
| 2023/0344508 A1 | 10/2023 | Tseng et al. | |

FOREIGN PATENT DOCUMENTS

| | | | |
|---|---|---|---|
| CN | 107592978 A | 1/2018 | |
| CN | 109845378 A | 6/2019 | |
| CN | 110169189 A | 8/2019 | |
| EP | 3043616 A1 | 7/2016 | |
| EP | 3404989 A1 | 11/2018 | |
| EP | 3858082 A1 | 8/2021 | |
| TW | 201911933 A | 3/2019 | |
| TW | 201914348 A | 4/2019 | |
| WO | WO 2013/012265 A2 | 1/2013 | |
| WO | WO 2013/113321 A1 | 8/2013 | |
| WO | WO 2018/204766 A1 | 11/2018 | |
| WO | WO 2019/098906 A1 | 5/2019 | |
| WO | WO 2019/241978 A1 | 12/2019 | |
| WO | WO 2021/056388 A1 | 4/2021 | |
| WO | WO 2021/125807 A1 | 6/2021 | |

OTHER PUBLICATIONS

Office Action for Egyptian Application No. 2022081085 dated Apr. 1, 2024, 14 pages.

Notice of Allowance for Chinese Application No. 202110164686.8 dated Jan. 5, 2024, 3 pages.

Office Action for Taiwanese Application No. 111145552 dated Dec. 28, 2023, 22 pages.

Qualcomm Incorporated, "Channel Structure for Two-Step RACH", 3GPP TSG-RAN WG1 Meeting #99, R1-1913278, (Nov. 18-22, 2019), 10 pages.

3GPP TS 38.306; Version 15.8.0 Release 15; 3rd Generation Partnership Project; Technical Specification; Group Radio Access Network; NR; User Equipment (UE_Radio Access Capabilities; Dec. 2019; 60 pages.

3GPP TS 38.321; Version 15.3.0 Release 15; ETSI TS 138 321 v15.3.0; Technical Specification; Medium Access Control (MAC) Protocol Specification; Sep. 2018; 77 pages.

3GPP TS 38.331; Version 15.8.0 Release 15; ETSI TS 138 331 v15.8.0; Technical Specification; Radio Resource Control (RRC); Protocol Specification; Jan. 2020; 527 pages.

Non-Final Office Action for U.S. Appl. No. 17/169,009 dated Apr. 29, 2021.

Notice of Allowance for U.S. Appl. No. 17/169,009 dated Nov. 15, 2021.

Sequans Communications, "TA update after PUR transmission via MAC CE", 3GPP TSG-RAN WG2 Meeting #107, R2-1913349, (Aug. 26-30, 2019), 4 pages.

Office Action for Canadian Application No. 3,166,474 dated May 17, 2024, 4 pages.

Office Action for Indonesian Application No. P00202209449 dated May 22, 2024, 6 pages.

Notice of Acceptance for Australian Application No. 2024201999 dated Jun. 6, 2024, 3 pages.

Decision to Grant for Japanese Application No. 2024-023618 dated Jul. 1, 2024, 4 pages.

ZTE Corporation, "Configuration aspects for 2-step RACH", 3GPP TSG RAN WG2 Meeting #107bis, R2-1913369, (Oct. 14-18, 2019), 10 pages.

Office Action for Thailand Application No. 2201004930 dated May 31, 2024, 8 pages.

Notice of Allowance for Taiwanese Application No. 111145552 dated Jun. 28, 2024, 3 pages.

Notice of Allowance for U.S. Appl. No. 18/652,406 dated Jul. 3, 2024.

Office Action for Japanese Application No. 2022-548012 dated May 13, 2024, 5 pages.

Examination Report for Australian Application No. 2024201999 dated May 20, 2024, 3 pages.

CATT, "RA Type Selection Between Legacy CFRA and 2-Step CBRA", 3GPP TSG-RAN WG2 Meeting #108, R2-1914424, (Nov. 18-22, 2019), 3 pages.

Office Action for Canadian Application No. 3,166,474 dated Aug. 28, 2023, 5 pages.

Office Action for Chinese Application No. 202110164686.8 dated May 13, 2023, 15 pages.

Office Action for Japanese Application No. 2022-548012 dated Sep. 26, 2023, 5 pages.

Office Action for Saudi Arabia Application No. 522440067 dated Sep. 9, 2023, 6 pages.

ZTE Corporation et al., "Running MAC CR for 2-step RACH", 3GPP TSG-RAN WG2 Meeting #107-bis, R2-1913370, (Oct. 14-18, 2019), 32 pages.

ZTE Corporation, "Status Report to TSG1 Work Plan Related Evaluation 2. Detailed Progress in RAN WGs since Last TSG Meeting (for all involved WGs)", 3GPP TSG RAN Meeting #86, RP-192414, (Dec. 9-12, 2019), 32 pages.

Extended European Search Report for European Application No. 20917471.3 dated Oct. 9, 2023, 13 pages.

Techplayon, "5G NR RACH Preamble Types: Long and Short Preambles", Retrieved via the Wayback Machine on Dec. 27, 2023,

(56) References Cited

OTHER PUBLICATIONS

<URL:https://web.archive.org/web/20191204114855/https://www.techplayon.com/5g-nr-rach-preamble-types-long-and-short-preambles/>, (Jul. 10, 2019), 5 pages.

Wireless Brew, "NR RACH Trigger Reasons With Details", Retrieved via the Wayback Machine on Dec. 27, 2023, <URL:https://web.archive.org/web/20211023014942/https://wirelessbrew.com/5g-nr/5g-nr-rach-trigger-reasons-with-details/>, (Oct. 23, 2021), 7 pages.

Qualcomm Inc., "New WID on NR-Based Access to Unlicensed Spectrum", 3GPP TSG RAN Meeting #82, RP-182878, (Dec. 10-13, 2018), 8 pages.

ZTE Corporation et al., "New Work Item: 2-Step RACH for NR", 3GPP TSG RAN Meeting #82, RP-182894, (Dec. 10-13, 2018), 5 pages.

Examination Report for Australian Application No. 2020427793 dated Oct. 19, 2023, 4 pages.

"3rd Generation Partnership Project; Technical Specification Group Radio Access Network; NR; Medium Access Control (MAC) protocol specification (Release 16)", 3GPP TS 38.321 v16.10.0, (Sep. 2022), 159 pages.

"3rd Generation Partnership Project; Technical Specification Group Radio Access Network; NR; NR and NG-RAN Overall Description; Stage 2 (Release 16)", 3GPP TS 38.300 v16.4.0, (Dec. 2020), 149 pages.

"3rd Generation Partnership Project; Technical Specification Group Radio Access Network; NR; Radio Resource Control (RRC) protocol specification (Release 15)", 3GPP TS 38.331 v15.3.0, (Sep. 2018), 445 pages.

"3rd Generation Partnership Project; Technical Specification Group Radio Access Network; NR; Radio Resource Control (RRC) protocol specification (Release 16)", 3GPP TS 38.331 v16.1.0, (Jul. 2020), 911 pages.

"3rd Generation Partnership Project; Technical Specification Group Radio Access Network; NR; User Equipment (UE) radio access capabilities (Release 16)", 3GPP TS 38.306 v16.10.0, (Sep. 2022), 161 pages.

"5G; NR; Overall Description; Stage 2 (3GPP TS 38.300 version 15.8.0 Release 15)", ETSI TS 138 300 v15.8.0, (Jan. 2020), 102 pages.

Ericsson, "Preamble Group Handling for 2-Step RA", 3GPP TSG-RAN WG2 #108, R2-1915604, (Nov. 18-22, 2019), 4 pages.

Ericsson, "PUSCH Selection and MsgA Payloads in 2-Step RA", 3GPP TSG-RAN WG2 #107bis, R2-1912682, (Oct. 14-18, 2019), 4 pages.

Ericsson, "RA Type Switch and Fallback in 2-Step RA", 3GPP TSG-RAN WG2 #108, R2-1915602, (Nov. 18-22, 2019), 3 pages.

Ericsson, "UE Switch from CBRA to CFRA and Possible Issues", 3GPP TSG-RAN WG2 AH 1807, R2-1810084, (Jul. 2-6, 2018), 2 pages.

ETSI MCC, "Report of 3GPP TSG RAN2#107 Meeting", 3GPP TSG-RAN WG2 Meeting #107bis, R2-1912001, (Aug. 26-30, 2019), 66 pages.

ETSI MCC, "Report of 3GPP TSG RAN2#108 Meeting", R2-2000009, (Nov. 18-22, 2019), 73 pages.

First Examination Report for Indian Application No. 202227050408 dated Mar. 13, 2023, 6 pages.

International Search Report and Written Opinion for Patent Cooperation Treaty Application No. PCT/CN2020/074449 dated Oct. 28, 2020, 9 pages.

LG Electronics Inc., "Discussion on MsgA Payload Rebuilding Issue", 3GPP TSG-RAN WG2 Meeting #107, R2-1910984, (Aug. 26-30, 2019), 3 pages.

New Postcom, "Consideration on RA Response Window Size for SCell", 3GPP TSG RAN WG2 Meeting #79, R2-123485, (Aug. 13-17, 2012), 3 pages.

Nokia et al., "CFRA for 2-Step RACH", 3GPP TSG-RAN WG2 Meeting #108, R2-1915330, (Nov. 18-22, 2019), 3 pages.

Nokia et al., "Correction to Preamble Group Selection for CBRA", 3GPP TSG-RAN Wg2 Meeting NR Adhoc 1807, R2-1810158, CR 0247, (Jul. 2-6, 2018), 5 pages.

Nokia et al., "Solutions for the Msg3 Issue when Switching from CBRA to CFRA", 3GPP TSG-RAN WG2 Meeting #103, R2-1812109, (Aug. 20-24, 2018), 2 pages.

Nokia et al., "Stage-2 Running CR for 2-Step RACH", 3GPP TSG-RAN WG2 Meeting #108, R2-1915889, (Nov. 18-22, 2019), 9 pages.

Nokia et al., "Summary of Discussion on Rebuilding and Fallback", 3GPP TSG-RAN WG2 Meeting #107bis, R2-1914052, (Oct. 14-18, 2019), 7 pages.

Notice of Allowance for Taiwanese Application No. 110104279 dated Aug. 30, 2022, 3 pages.

Office Action for Australian Application No. 2020427793 dated Apr. 26, 2023, 2 pages.

Office Action for Taiwanese Application No. 110104279 dated Oct. 19, 2021, 13 pages.

Office Action for Vietnamese Application No. 1-2022-05672 dated Oct. 7, 2022, 2 pages.

OPPO, "Remaining Stage-2 Open Issues for 2-Step RACH", 3GPP TSG-RAN WG2 Meeting #107bis, R2-1912086, (Oct. 14-18, 2019), 4 pages.

ZTE Corporation et al., "Running MAC CR for 2-Step RACH", 3GPP TSG-RAN WG2 Meeting #108, R2-1914798, (Nov. 18-22, 2019), 36 pages.

ZTE Corporation, "Draft MAC CR for 2-Step CFRA", 3GPP TSG-RAN WG2 Meeting #108, R2-1915268, (Nov. 18-22, 2019), 39 pages.

ZTE Corporation, "Revised Work Item Proposal: 2-Step RACH for NR", 3GPP TSG RAN Meeting #83, RP-190711, (Mar. 18-21, 2019), 4 pages.

ZTE Corporation, "Summary of Running MAC CR Review Issue List", 3GPP TSG-RAN Meeting #107-bis, R2-1913449, (Oct. 14-18, 2019), 57 pages.

ZTE Corporation, "Summary of Running MAC CR Review Issue List", 3GPP TSG-RAN2 Meeting #108, R2-1914799, (Oct. 14-18, 2019), 85 pages.

ZTE Corporation, "Support of CFRA with 2-Step RACH", 3GPP TSG-RAN Meeting #108, R2-1914800, (Nov. 18-22, 2019), 8 pages.

Office Action for Saudi Arabian Application No. 522440067 dated Oct. 8, 2024, 10 pages.

Office Action for European Application No. 20917471.3 dated Jul. 18, 2024, 7 pages.

Decision to Grant for Japanese Application No. 2022-548012 dated Aug. 1, 2024, 4 pages.

Examination Report for Australian Application No. 2024219810 dated Aug. 6, 2025, 3 pages.

Office Action for Mexican Application No. MX/a/2024/009179 dated Jul. 31, 2025, 10 pages.

Office Action for Korean Application No. 10-2022-7030584 dated Mar. 21, 2025, 18 pages.

Office Action for Malaysian Application No. PI2024002788 dated Mar. 25, 2025, 4 pages.

Office Action for Mexican Application No. MX/a/2022009665 dated Feb. 12, 2025, 6 pages.

Decision to Grant for ARIPO Application No. AP/P/2022/014260 dated Oct. 21, 2024, 5 pages.

Decision to Grant for Japanese Application No. 2024-124580 dated Dec. 5, 2024, 4 pages.

Extended European Search Report for European Application No. 25178427.8 dated Jun. 26, 2025, 8 pages.

Notice for Eligibility of Grant for Singapore Application No. 11202251921A dated Nov. 12, 2024, 2 pages.

Notice of Acceptance for South African Application No. 2024/08969 dated Jun. 2, 2025, 2 pages.

Notice of Allowance for Vietnamese Application No. 1-2022-05672 dated Dec. 30, 2024, 2 pages.

Office Action for Colombian Application No. NC2025/0005148 dated Jun. 17, 2025, 5 pages.

Office Action for Malaysian Application No. PI 2022004209 dated Mar. 26, 2025, 2 pages.

Office Action for Mexican Application No. MX/a/2022/009665 dated May 23, 2025, 6 pages.

(56) References Cited

OTHER PUBLICATIONS

Office Action for Saudi Arabian Application No. 522440067 dated Nov. 6, 2024, 6 pages.
Notice of Allowance for Mexican Application No. MX/a/2022/009665 dated Dec. 18, 2025, 6 pages.
Notice of Allowance for Philippine Application No. 1/2022/552016 dated Jan. 21, 2026, 2 pages.
Decision to Grant for ARIPO Application No. AP/P/2024/016151 dated Oct. 28, 2025, 41 pages.
Office Action for Egyptian Application No. EG/1/2022/01085 dated Nov. 3, 2025, 6 pages.
Examination Report for Singapore Application No. 10202401439R dated Dec. 9, 2025, 2 pages.
Notice for Eligibility of Grant for Singapore Application No. 10202401439R dated Dec. 9, 2025, 2 pages.
Notice of Allowance for Brazilian Application No. BR112022015491-7 dated Sep. 25, 2025, 10 pages.
Notice of Allowance for Philippine Application No. 1/2024/551034 dated Dec. 16, 2025, 3 pages.
Decision to Grant for ARIPO Application No. AP/P/2024/015871 dated Oct. 23, 2025, 42 pages.
Decision to Grant for Colombian Application No. NC2022/0012627 dated Aug. 15, 2025, 6 pages.
Notice of Acceptance for Australian Application No. 2024219810 dated Sep. 26, 2025, 7 pages.
Notice of Allowance for Canadian Application No. 3,166,474 dated Aug. 27, 2025, 8 pages.
Office Action for Egyptian Application No. EG/P/2022/01085 dated Oct. 1, 2025, 16 pages.
Office Action for Mexican Application No. MX/a/2024/009179 dated Oct. 6, 2025, 10 pages.
Office Action for Philippine Application No. 1/2022/552016 dated Oct. 17, 2025, 5 pages.
Office Action for Philippine Application No. 1/2024/551034 dated Oct. 21, 2025, 4 pages.
Office Action for Korean Application No. 10-2022-7030584 dated Mar. 13, 2026, 10 pages.
Office Action for Taiwanese Application No. 113137141 dated Jan. 29, 2026, 18 pages.
3GPP TS 38.321; Version 15.8.0 Release 15; ETSI TS 138 321 v15.8.0; 5G; NR; Medium Access Control (MAC) protocol specification, (Jan. 2020), 80 pages.
Decision to Grant for Japanese Application No. 2025-001893 dated Apr. 2, 2026, 4 pages.
First Examination Report for Indian Application No. 202428038197 dated Apr. 17, 2026, 11 pages.
Nokia et al., "On 2-step RACH Channel Structure", 3GPP TSG RAN WG1 #96, R1-1902135, (Feb. 25-Mar. 1, 2019), 8 pages.
Notice of Allowance for Thailand Application No. 2201004930 dated Mar. 11, 2026, 2 pages.

* cited by examiner

100

102

200

300

310

A CFRA RESOURCE IS ALLOCATED FROM A SECOND DEVICE FOR A FIRST RA TYPE?

YES

320

COMPARE A TARGET TRANSPORT BLOCK SIZE CORRESPONDING TO THE CFRA RESOURCE WITH A FIRST TB SIZE CONFIGURED FOR A FIRST GROUP OF PREAMBLES AVAILABLE FOR THE FIRST RA TYPE

330

PERFORM RA TO THE SECOND DEVICE BASED ON A RESULT OF THE COMPARISON

40

RANDOM ACCESS IN COMMUNICATION SYSTEM

CROSS-REFERENCE TO RELATED APPLICATIONS

This application is a national phase entry of International Application No. PCT/CN2020/074449, filed Feb. 6, 2020, the contents of which are hereby incorporated by reference in their entirety.

FIELD

Embodiments of the present disclosure generally relate to the field of telecommunication and in particular, to methods, devices, apparatuses and computer readable storage medium for random access in a communication system.

BACKGROUND

Various wireless communication systems have been developed and are being developed to meet an increasing demand for communication services. Prior to receiving communication service from a wireless communication system, a terminal device has to establish a connection with a network.

A random access (RA) procedure refers to a procedure for a terminal device to establish or reestablish a connection with a network device such as a Next Generation NodeB (gNB). Either contention-free random access (CFRA) or contention-based random access (CBRA) can be employed to perform the RA procedure. CFRA refers to the use of dedicated RA resources while CBRA refers to the use of shared RA resources. Once the connection has been established and/or reestablished, the network device can assign resources to a particular terminal device in support of further communication with the network device.

SUMMARY

In general, example embodiments of the present disclosure provide a solution for random access.

In a first aspect, there is provided a first device. The first device comprises at least one processor; and at least one memory including computer program code; where the at least one memory and the computer program code are configured to, with the at least one processor, cause the first device to determine whether a contention-free random access resource is allocated from a second device for a first random access type, in accordance with a determination that the contention-free random access resource is allocated, compare a target transport block size corresponding to the contention-free random access resource with a first transport block size configured for a first group of preambles available for the first random access type, and perform random access to the second device based on a result of the comparison.

In a second aspect, there is provided a method. The method comprises determining, at a first device, whether a contention-free random access resource is allocated from a second device for a first random access type; in accordance with a determination that the contention-free random access resource is allocated, comparing a target transport block size corresponding to the contention-free random access resource with a first transport block size configured for a first group of preambles available for the first random access type; and performing random access to the second device based on a result of the comparison.

In a third aspect, there is provided a first apparatus. The first apparatus comprises means for determining whether a contention-free random access resource is allocated from a second apparatus for a first random access type; in accordance with a determination that the contention-free random access resource is allocated, comparing a target transport block size corresponding to the contention-free random access resource with a first transport block size configured for a first group of preambles available for the first random access type; and performing random access to the second apparatus based on a result of the comparison.

In a fourth aspect, there is provided a computer readable medium. The computer readable medium comprises program instructions for causing an apparatus to perform at least the method according to any one of the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
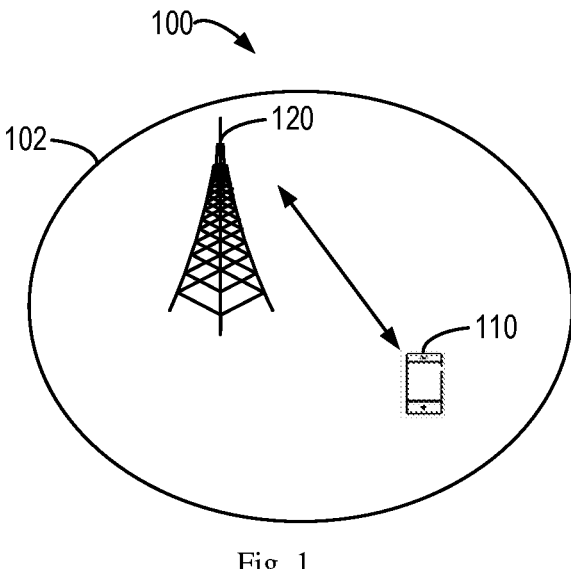
FIG. 1 illustrates an example communication system in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G),

4

4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, Integrated Access and Backhaul (IAB) node, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 shows an example communication system 100 in which example embodiments of the present disclosure can be implemented. The system 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102.

It is to be understood that the number of first and second devices is only for the purpose of illustration without suggesting any limitations. The communication system 100 may include any suitable number of first and second devices adapted for implementing embodiments of the present disclosure. Although not shown, it would be appreciated that one or more additional devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication system 100, the first device 110 and the second device 120 can communicate data and control information to each other. In the case that the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Typically, in order to communicate data with the second device 120, the first device 110 may initiate a RA procedure to establish a connection with the second device 120. The RA procedure may be triggered by a number of events, such as an initial access to the second device 120 from an idle status, a connection re-establishment procedure, DL or UL data arrival during the connected mode when UL synchronisation status is "non-synchronised," UL data arrival during the connected mode when there are no physical uplink control channel (PUCCH) resources for a scheduling request (SR) available, SR failure, a request by radio resource control (RRC) upon synchronous reconfiguration (e.g. handover), transition from a radio resource control (RRC) inactive state, establishing time alignment for a secondary timing advance group (TAG), a request for other system information (SI), a beam failure recovery (BFR), and so on. In some cases, the first device 110 might have to attempt for a number of times to transmit a RA preamble before the second device 120 can successfully detect the RA preamble.

Either contention-free random access (CFRA) or contention-based random access (CBRA) can be employed. CFRA refers to the use of dedicated RA resources while CBRA refers to the use of shared RA resources. CBRA may lead to a situation where multiple terminal devices attempt to access the network device through respective RA procedures using the same RA resource, and therefore requires contention resolution. CFRA is performed based on a specific random access resource assigned by the network device, without contention with other terminal devices.

A RA resource may, for example, include a RA preamble (or a preamble in short) at least, and may possibly include a time-frequency resource in uplink for message transmission. Depending on messages required for exchanging between the first device 110 and the second device 120, the RA procedures may include slow RA type, quick RA type, or the like.

An example of the slow RA type includes a four-step RA (or 4-step RA) where the first device 110 transmits a RA preamble in a first message (represented as "MSG1" sometimes) to the second device 120 and following steps are then performed depending on whether the RA procedure is contention-based (i.e., CBRA) or contention-free (i.e., CFRA). For example, if a 4-step CBRA is performed, at least additional three messages are exchanged between the first device 110 and the second device 120. If a 4-step CFRA is performed, the first device 110 may transmit one additional message as a response to MSG1. Example procedures of the 4-step CBRA and 4-step CFRA will be further introduced in the following.

An example of the quick RA type includes a two-step RA (or 2-step RA) where the first device 110 transmits both a RA preamble and payload to the second device 120 in one message (represented as "MSGA" sometimes). The second device 120 generally transmit one response message (represented as "MSGB" sometimes) to MSGA in either the contention-based or CFRA procedure. MSGB may include a response(s) for contention resolution, a fallback indication(s), or a backoff indication. As such, the time spent for completing the 2-step RA is generally shorter than that for completing the 4-step RA. The quick RA type has been proposed recently to enable fast access of a first device (for example, a terminal device) to a second device (for example, a network device) in certain cases. In some cases, the 2-step CFRA is supported for handover.

It has been agreed that the first device 110 can select the type of RA (e.g., quick RA or slow RA, or, 2-step RA or 4-step RA), for example, at initiation of the random access procedure based on network configuration. In some implementations, if CFRA resources are not configured, a signal quality threshold (such as a RSRP threshold) is used by the first device 110 to select between the quick RA type (e.g., 2-step RA type) and the slow RA type (e.g., 4-step RA type). In some implementations, if CFRA resources for the slow RA type are configured, UE selects the slow RA type, and if CFRA resources for the quick RA type are configured, UE selects the quick RA type. The second network device 120 may not configure CFRA resources for the quick RA type and the slow RA type at the same time for a Bandwidth Part (BWP).

In some implementations, for RA in a cell configured with a supplementary uplink (SUL), the second device 120 can explicitly signal which carrier to use (UL or SUL). Otherwise, the first device 110 may select the SUL carrier if and only if the measured quality of the DL is lower than a broadcast threshold. The first device 110 may perform carrier selection before selection between the plurality of RA types. The RSRP threshold for selecting between the quick RA type and the slow RA type may be configured separately for UL and SUL. After the carrier selection, uplink transmissions of the RA procedure remain on the selected carrier.

In some implementations where carrier aggregation (CA) is configured, a RA procedure with a quick RA type (e.g., 2-step RA type) may be configured to be only performed on a primary cell (PCell) or on a primary secondary cell (PSCell). For a RA procedure with a slow RA type (e.g., 4-step RA type), the first three steps of CBRA may always occur on the PCell while contention resolution (the fourth step) can be cross-scheduled by the PCell. The three steps of a CFRA started on the PCell remain on the PCell. CFRA on a secondary cell (SCell) may only be initiated by the second device 120 to establish timing advance for a secondary TAG, where the procedure is initiated by the second device 120 with a physical downlink control channel (PDCCH) order that is sent on a scheduling cell of an activated SCell of the secondary TAG, preamble transmission takes place on the indicated SCell, and RAR takes place on PCell.

During a RA procedure, the first device 110 monitors for a response from the second device 120 within a configured window after the RA preamble is transmitted (e.g., in MSG1 in the 4-step RA) or after the RA preamble and the payload is transmitted (e.g., in MSGA in the 2-step RA). For CFRA, upon receiving the response from the second device 120, the first device 110 ends the RA procedure. For 2-step CBRA, if contention resolution is successful upon receiving the response from the second device 120, the first device 110 ends the RA procedure. Otherwise, the first device 110 may need to switch between the slow RA type and the quick RA type (e.g., from the 2-step RA to the 4-step RA), or fall back from one type of RA to the other type of RA (e.g., from the quick RA to the slow RA).

For example, if the 2-step RA procedure is not successfully completed even after transmitting MSGA for a number of times ("N" times), the first device 110 may switch to 4-step RA. The number of times "N" may be configured by the second device 120. In case the second device 120 received only the preamble part of the MSGA, it may send a fallback indication to the first device 110 based on the preamble identification. In the fallback case, the first device 110 may perform MSG3 transmission and monitor contention resolution. If contention resolution is not successful after MSG3 (re)transmission(s), the first device 110 may go back to MSGA transmission. If the 2-step RA is not successfully completed after a number of MSGA transmissions and no fallback indication can be received from the second device 120, the first device 110 can be configured to switch to 4-step CBRA.

Typically, to perform a RA procedure, a first device may select a preamble for transmission. In the 4-step RA procedure, a first device can select between Random Access Preambles groups A and B based on a condition of a radio connection with a second device and available data in the buffer or alternatively, based on solely on a size of a common control channel (CCCH) service data unit (SDU) in the buffer. For example, as specified in 3GPP TS 38.321, a UE can select between Random Access Preambles groups A and B according to the specifications in Table 1 as below.

Random Access Procedure)—preambleReceivedTarget-Power—msg3-DeltaPreamble—messagePowerOffset-GroupB") are used to determine the selection between the Random Access Preambles group B and the Random Access Preambles group A. As such, by detecting a preamble from either the Random Access Preambles group B or the Random Access Preambles group A from the UE, the network device can roughly determine the data amount to be sent and the condition of the radio connection with the UE, based on which the network device may then determine the resources allocated to the UE.

It is recently agreed to introduce a plurality of groups of preambles for the quick RA type, e.g., the 2-step RA, and the same selection method as used in the 4-step RA (e.g., comparisons based on the thresholds ra-Msg3SizeGroupA and "PCMAX (of the Serving Cell performing the Random Access Procedure)—preambleReceivedTargetPower—msg3-DeltaPreamble—messagePowerOffsetGroupB") can be applied to select between the groups of preambles for the quick RA type. It is also agreed that a transport block size (TB size) granted in the slow RA type (e.g., the 4-step RA) shall be the same as the TB size configured for the quick RA type if the first device switches from the quick RA type to the slow RA type.

However, there will be problems if the same selection method used in the 4-step RA is always applied in the case where CFRA resources are allocated for the quick RA as the first device may switch between the quick RA and the slow RA. In a possible solution, it is proposed to allow the second device to configure along with the allocation of CFRA resources which group of preambles shall always be used by the first device if CBRA is triggered for a RA procedure. Such solution requires extra signaling by the second device. As an alternative, it could be specified which group to use always in the case where CFRA resources are allocated but CBRA is triggered for a RA procedure. For example, a first group of preambles is always used as it is always configured for the first device, or a second group of preambles is always used when configured. This alternative solution limits the flexibility of the second device in using the TB size for the first or second groups to allocate CFRA resources.

TABLE 1

| 5.1.2 Random Access Resource selection |
|---|

The MAC entity shall:
    (. . .)
    2> if Msg3 has not yet been transmitted:
        3> if Random Access Preambles group B is configured:
            4> if the potential Msg3 size (UL data available for transmission plus MAC
                header and, where required, MAC CEs) is greater than ra-Msg3SizeGroupA
                and the pathloss is less than PCMAX (of the Serving Cell performing the
                Random Access Procedure) - preambleReceivedTargetPower -
                msg3-DeltaPreamble - messagePowerOffsetGroupB; or
            4> if the Random Access procedure was initiated for the CCCH logical channel
                and the CCCH SDU size plus MAC subheader is greater than
                ra-Msg3SizeGroupA:
                5> select the Random Access Preambles group B.
            4> else:
                5> select the Random Access Preambles group A.
        3> else:
            4> select the Random Access Preambles group A.
    (. . .)

From the above specifications, a threshold for available data in the buffer (e.g., the parameter ra-Msg3SizeGroupA) and a threshold for the pathloss (e.g., the threshold represented by "PCMAX (of the Serving Cell performing the According to example embodiments of the present disclosure, there is provided a solution for performing RA. In this solution, if a CFRA resource is allocated from a second device to a first device for a certain RA type (for example, a quick RA type), the first device compares a target transport block (TB) size corresponding to the CFRA resource with a TB size configured for an available group of preambles for the certain RA type. The first device performs RA to the second device based on a result of the comparison. As such, depending on whether the TB size for the CFRA matches or mismatches with the TB size configured for the available group of preambles, the first device can properly perform selection of preamble groups or selection between CFRA and CBRA without requiring extra signaling from the second device. The second device is not subject to any restrict limitation on the resource allocation as the first device is still allowed to perform the selection in different conditions.

Figure 2:
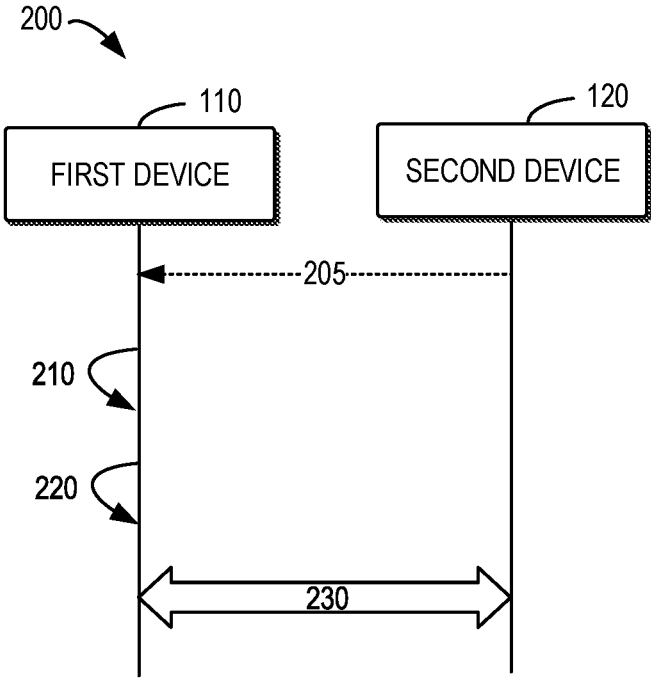
FIG. 2 illustrates a signaling flow for random access according to some example embodiments of the present disclosure.

Example embodiments of the present disclosure will be described in detail below with reference to the accompanying drawings. Reference is now made to FIG. 2, which shows a signaling flow 200 for RA according to some example embodiments of the present disclosure. For the purpose of discussion, the signaling flow 200 will be described with reference to FIG. 1. The signaling flow 200 may involve the first device 110 and the second device 120 as illustrated in FIG. 1.

In the signaling flow 200, the first device 110 determines 210 whether a CFRA resource is allocated from the second device 120 for a certain RA type (sometimes referred to as a "first RA type" for ease of description herein).

There may be a plurality of RA types to be used by the first device 110 and different RA types require different messaging procedures between the first device 110 and the second device 120. The RA types may include one or more relatively quick RA types and one or more relatively slow RA types. A quick RA type generally requires less messages exchanged between the two devices than a slow RA type. An example quick RA type is a so-called 2-step RA, which typically requires two messages exchanged between the first device 110 and the second device 120 to complete the RA. An example slow RA type is a so-called 4-step RA, which typically requires up to four messages exchanged between the first device 110 and the second device 120 to complete CBRA or fewer messages in CFRA.

In some example embodiments, the first device 110 may utilize the information whether a CFRA resource is allocated for the quick RA type (the 2-step RA type in a specific example) to decide how RA is performed as described below.

The second device 120 may allocate one or more CFRA resources for one or more RA types that are potentially selected by the first device 110. Typically, a CFRA resource is assigned by the second device 120 for a specific RA type. By using the CFRA resource, the first device 110 is able to implement CFRA, without contention with other devices. A CFRA resource may include a dedicated preamble assigned to the first device 110. In some example embodiments, the CFRA resource may also include a time-frequency resource for transmission of the dedicated preamble. Generally, a preamble is transmitted in a physical random access channel (PRACH), and thus the time-frequency resource may thus be a PRACH resource. The time-frequency resource may not be specifically allocated via a dynamical resource assignment from the second device 120 but may be implicitly determined, for example, from other configuration information, such as an index of the dedicated RA preamble. If the CFRA resource is allocated to the quick RA type (such as the 2-step RA type) which requires a preamble and a payload to be transmitted in one message (i.e., "MSGA"), the CFRA resource may further include a time-frequency resource for transmission of payload of the first device 110. The payload may be transmitted in a physical uplink shared channel (PUSCH) in some examples, and thus the time-frequency resource may be a PUSCH resource. The payload may include identification of the first device 110, control information, and/or data.

If the second device 120 allocates 205 the CFRA resource for the first RA type to the first device 110 and the first device 110 can determine that the CFRA resource is allocated, the first device 110 further compares 220 a TB size corresponding to the allocated CFRA resource with a TB size configured for a group of preambles available for the first RA type. The TB size corresponding to the CFRA resource indicates a size of payload that can be transmitted to the second device 120 using the CFRA resource. In the 2-step RA, the CFRA resource is allocated for transmission of MSGA, and the TB size indicates the size of payload transmitted in PUSCH in MSGA.

The first device 110 may be configured by the second device 120 with one or more groups of preambles for CBRA with the first RA type. The first device 110 is allowed to select a preamble from one of the groups of preambles for transmission to the second device 120. In addition to the preambles, the second device 120 may configure a TB size for each of the groups of preambles, and one or more preconfigured parameters for selecting each of the groups of preambles (such as a threshold for available data in the buffer (represented as ra-MsgASizeGroupA) and parameters related to a threshold for the pathloss (such as parameters PCMAX, preambleReceivedTargetPower, msg3-DeltaPreamble, and messagePowerOffsetGroupB). The TB size configured for a group of preambles indicates a size of payload that can be transmitted to the second device 120 together with a preamble in that group of preambles (for example, in MSGA for 2-step RA). In CBRA, the payload may be transmitted using a PUSCH resource.

In some example embodiments, for a quick RA type, the first device 110 may be configured with Random Access Preambles group A and Random Access Preambles group B. Respective TB sizes may be configured for the Random Access Preambles group A and Random Access Preambles group B. It would be appreciated that more than two groups of preambles for a certain RA type may also be configured to the first device 110.

For ease of description, the TB size that is compared with the target TB size is sometimes referred to as a first TB size and the associated group of preambles is sometimes referred to as a first group of preambles. Upon comparison of the target TB size with the first TB size, the first device 110 performs 230 RA to the second device 120 based on a result of the comparison.

In performing the RA, The first device 110 may perform selection of preamble groups for performing RA or selection between CFRA and CBRA at least based on the result of the comparison. Some example embodiments related to the RA performed based on the result of the comparison will be described in detail below.

In some example embodiments, the first device 110 selects a group of preambles for performing RA based on the result of the comparison. Specifically, if the first device 110 determines that the target TB size matches with the first TB size configured for the first group of preambles, the first device 110 may perform the RA based on the first group of preambles. In other words, when a CFRA resource is allocated, the first device 110 may use the group of preambles having the TB size matching with the target TB size to decide how the RA is performed, for example, how CBRA is performed. As used herein, the term "match" means that the two sizes are equal to or substantially equal to each other. In an example embodiment, if the first device 110 may be configured with a plurality of groups of preambles for the first RA type, the first device 110 may compare a plurality of TB sizes configured for the plurality of respective groups of preambles (including the first TB size) with the target TB size corresponding to the allocated CFRA resource. The comparison may be performed for the plurality of respective groups of preambles one by one. By allowing the first device 110 to select the group of preamble with the configured TB size matching with the target TB size of the CFRA resource, the first device 110 can easily switch between CFRA and CBRA.

It is noted that in example embodiments of the present disclosure, using the TB sizes configured for the first RA type to be compared with the target TB size does not mean that the first device 110 will always select the first RA type for performing RA. If the first device 110 is allowed to select between the first RA type and one or more other RA types (such as a second RA type), the first device 110 can still follow the RA type selection criterion to determine which RA type is selected for use.

If the first TB size matches with the target TB size and the first RA type is used, the first device 110 may perform a CBRA attempt with the first RA type based on the corresponding first group of preambles. In some examples, the first group of preambles with the matched TB size may be either Random Access Preambles group A or Random Access Preambles group B for a 2-step RA type. In performing the CBRA attempt with the first RA type, the first device 110 may select a preamble from the first group of preambles, and transmit the selected preamble (e.g., in PRACH) and payload of the first TB size (e.g., in PUSCH) to the second device 120.

If the first TB size matches with the target TB size and a different RA type (e.g., a second RA type) other than the first RA type is used (for instance, if the 2-step RA procedure is not successfully completed even after transmitting MSGA for a number of times ("N" times), the first device 110 may switch to 4-step RA), the first device 110 may determine whether a CBRA attempt with the second RA type can be performed and perform the CBRA attempt with the second RA type using a group of preambles that is configured for the second RA type and is corresponding with the first group of preambles for the first RA type. In some examples, the first group of preambles with the matched TB size may be either Random Access Preambles group A or Random Access Preambles group B for a 2-step RA type and the group of preambles that is corresponding with the first group of preambles for a 2-step RA type may be either Random Access Preambles group A or Random Access Preambles group B for a 4-step RA, respectively. In performing the CBRA attempt with the second RA type, the first device 110 may select a preamble from the group of preambles that is configured for the second RA type and is corresponding with the first group of preambles for the first RA type, and transmit the selected preamble (e.g., in PRACH) to the second device 120. Some example embodiments where the second RA type is used will be described in further detail in the following.

In some example embodiments, if the first device 110 determines that the target TB size does not match with TB sizes configured for any other groups of preambles, the first device 110 may decide to perform RA based on a predetermined group of preambles (sometimes referred to as a "third group of preambles") that is available for the first RA type. For example, the first device 110 may be configured with two groups of preambles (such as Random Access Preambles group A and Random Access Preambles group B), the first device 110 may first determine whether the target TB size matches with a TB size configured for the Random Access Preambles group B. If a mismatch is found (i.e., the target TB size mismatches with the TB size configured for the Random Access Preambles group B), the first device 110 may directly decide to perform RA based on the Random Access Preambles group A. As an alternative, the first device 110 may compare the TB size configured for the Random Access Preambles group A with the target TB size and may use the Random Access Preambles group B for performing RA if a mismatch is found.

As the TB sizes for the groups of preambles may be configured by the second device 120 to the first device 110 before the CFRA resource is allocated to the first device 110, in some example embodiments, the second device 120 may allocate the CFRA resource based on the TB sizes configured for the groups of preambles, such that the target TB size of the allocated CFRA can always match with a TB size configured for one of the groups of preambles.

In some example embodiments, if the CFRA resource is not allocated to the first device 110 and the first device 110 decides to perform RA with the first RA type, the first device 110 may select the group of preambles for CBRA of the first RA type based on the configured parameters, including the threshold for available data in the buffer (such as ra-MsgASizeGroupA) and parameters related to a threshold for the pathloss (such as PCMAX, preambleReceivedTarget-Power, msg3-DeltaPreamble, messagePowerOffset-GroupB), similarly as the selection method specified for the 4-step RA.

In some example embodiments, as the selection of the groups of preambles is required generally when CBRA is triggered, in the case of the CFRA resource is determined to be allocated, before the comparison of the TB sizes, the first device 110 may determine whether transmission on the allocated CFRA resource is available. In the case where the transmission on the allocated CFRA resource is available, the first device 110 may perform CFRA with the first RA type using the allocated CFRA resource. In the case where the transmission on the allocated CFRA is unavailable, the first device 110 determines that CBRA is to be performed and thus may start the comparison of the TB sizes so as to determine which group of preambles is used for CBRA. The availability of transmission on the allocated CFRA resource may depend on availability of a beam associated with the CFRA resource The availability of a beam may be subject to, for instance, the beam reference signal received power (RSRP) being above a configured RSRP threshold. If there is no beam available for the CFRA resource, the first device 110 may determine that the allocated CFRA resource cannot be used for transmission.

In some example embodiments, the selection of the group of preambles and the corresponding TB size are determined before the first CBRA attempt is started. Thus, before the comparison of the TB sizes, the first device 110 may determine whether a previous CBRA attempt is performed. If there is no previous CBRA attempt performed, the first device 110 may start comparison of the TB sizes so as to determine which group of preambles is used for the CBRA.

It is noted that in the example embodiments related to the selection of the group of preambles, the first RA attempt of the first device 110 may be CFRA using the allocated CFRA resource or CBRA as described above. The scope of the present disclosure is not limited in this regard.

As an example, the selection between the groups of preambles according to some example embodiments of the present disclosure may be performed in a media access control (MAC) entity of the first device 110. The operations related to the selection between the groups of preambles may be summarized in Table 2 as below.

TABLE 2

| 5.1.2a Random Access Resource selection for 2-step random access |
|---|
| The MAC entity shall:<br>    (. . .)<br>    1> if MSGA has not yet been transmitted:<br>        2> if Random Access Preambles group B for 2-step RA is configured:<br>            3> if the contention-free 2-step Random Access Resources have been explicitly<br>                provided by RRC:<br>                4> if the transport block size associated with the contention-free 2-step Random<br>                    Access Resources correspond to the transport block size of the MSGA<br>                    associated with the Random Access Preambles group B of 2-step RA:<br>                    5> select the Random Access Preambles group B.<br>                4> else:<br>                    5> select the Random Access Preambles group A.<br>            3> else if the potential MSGA payload size (UL data available for transmission<br>                plus MAC header and, where required, MAC CEs) is greater than<br>                [ra-MsgASizeGroupA] and the pathloss is less than PCMAX (of the Serving<br>                Cell performing the Random Access Procedure) -<br>                [preambleReceivedTargetPower] - [msgA-DeltaPreamble] -<br>                [messagePowerOffsetGroupB]; or<br>            3> if the Random Access procedure was initiated for the CCCH logical channel<br>                and the CCCH SDU size plus MAC subheader is greater than<br>                [ra-MsgASizeGroupA ]:<br>                4> select the Random Access Preambles group B.<br>            3> else:<br>                4> select the Random Access Preambles group A.<br>        2> else:<br>            3> select the Random Access Preambles group A.<br>    1> else (i.e. MSGA is being retransmitted):<br>        2> select the same group of Random Access Preambles as was used for the Random<br>            Access Preamble transmission attempt corresponding to the first transmission of<br>            MSGA.<br>    (. . .) |

As mentioned above, the first device 110 may determine to select a different second RA type to perform RA. The result of comparison between the target TB size and the first TB size configured for the first group of preambles for the first RA type can still be used to guide how the first device 110 performs a CBRA attempt with the second RA type. In some example embodiments, the first device 110 may determine to perform RA with the second RA type upon detecting a trigger for a switch from the first RA type to the second RA type. A trigger for switching from the first RA type to the second RA type can be, for example, a number of RA attempts (CFRA or CBRA or both) with the first RA type reaching a predetermined threshold. For example, before selecting the second RA type, the first device 110 may have performed a number of CFRA attempts or a number of CBRA attempts with the first RA type. As an example, for a quick RA such as 2-step RA, if the first device 110 transmits MSGA (including a preamble and payload) to the second device 120 for a maximum number of N times and receives no response from the second device 120, the first device 110 may switch from the 2-step RA to another RA type, such as the 4-step RA. It would be appreciated that other triggers for switching from the first RA type to the second RA type are also possible.

In some example embodiments, if a trigger of switching from the first RA type to the second RA type is detected, the first device 110 may determine whether a group of pre- ambles (sometimes referred to a "second group of pre- ambles" for ease of description) for the second RA type is available for the first device 110 (e.g., configured by the second device 120 to the first device 110). Depending on the availability of the second group of preambles, the first device 110 may decide how the RA proceeds.

The first RA type may be a quick RA type, such as a 2-step RA type, and the second RA type may be a slow RA type, such as a 4-step RA type. There may be a plurality of groups of preambles for the second RA type, and the second device 120 may configure one or more of the plurality of groups of preambles to the first device 110. In the example where the second RA type requires the preamble and payload to be transmitted in separate messages (MSG1 and MSG3), the TB size allowable for transmission of the payload is dynami- cally configured by the second device 120. In particular, the second device 120 allocates a resource for transmission of the payload in a grant after successfully decoding the preamble from the first device 110. Thus, from the side of the first device 110, it cannot predict the TB size allowable for transmission of the payload in the second RA type.

The second group of preambles for the second RA type may be determined as being corresponding to the first group of preambles for the first RA type. That is, the first group of preambles for the first RA type with the TB size matching with the target TB size can be used by the first device 110 to determine which group of preambles for the second RA type is selected when perform the CBRA with the second RA type. There may be correspondence between groups of preambles for the respective first and second RA types, which may be known by both the first and second devices 110, 120. For example, the Random Access Preambles group A for the quick RA type may be corresponding to the Random Access Preambles group A for the slow RA type, and the Random Access Preambles group B for the quick RA type may be corresponding to the Random Access Pre- ambles group B. In some example embodiments, in performing RA based on a certain group of preambles for the second RA type, the second device 120 may allocate, to the first device 110, a resource corresponding to the same TB size as the one configured for the corresponding group of preambles for the first RA type. For example, if a first TB size is configured for a first group of preambles for the first RA type previously, upon receipt of a preamble selected from a second group of preambles from the second RA type, the second device 120 may allocate a resource that can be used to transmit the first TB size for the first device 110.

In some example embodiments, if the second group of preambles is available, the first device 110 may perform a further CBRA attempt with the second RA type based on the second group of preambles, for example, by sending a preamble selected from the second group of preambles from the second group of preambles. If the second group of preambles is unavailable, the first device 110 may determine that the RA to the second device 120 fails. That is, the first device 110 is not allowed to switch to the second RA type in this case. For example, in such case, a Random Access problem could be indicated by the MAC entity of the first device 110 to higher layers, such as the RRC layer.

As a specific example, the first device 110 may be configured with Random Access Preambles groups A and B for the quick RA type and only Random Access Preambles group A for the slow RA type. If the first device 110 performed a CBRA attempt with the quick RA type based on its Random Access Preambles group B according to the comparison of TB sizes as described above, it means that the TB size used is the TB size (equal to the target TB size) configured for the Random Access Preambles group B of the first RA type. In this case, the first device 110 is not allowed to switch to the slow RA type because transmitting a preamble from the available Random Access Preambles group A for the slow RA type to the second device 120 may trigger the second device 120 to allocate a resource with a different TB size than the TB size configured for the Random Access Preambles group B of the first RA type.

In some example embodiments, the first device 110 may only determine whether the Random Access Preambles group B for the slow RA type is available because the Random Access Preambles group A for the slow RA type is always configured to the first device 110.

As an example, the determination of the switch between the first and second RA types according to some example embodiments of the present disclosure may be performed in a MAC entity of the first device 110. The corresponding operations may be summarized in statements in Table 3 as below.

TABLE 3

| 5.1.4a MSGB reception and contention resolution for 2-step random access |
| --- |
| Once the MSGA is transmitted, regardless of the possible occurrence of a measurement gap, the MAC entity shall:<br>(. . .)<br>  1> if msgB -ResponseWindow expires, and the Random Access Response Reception has<br>      not been considered as successful based on descriptions above:<br>    2> increment PREAMBLE_TRANSMISSION_COUNTER by 1;<br>    2> if PREAMBLE_TRANSMISSION_COUNTER = preambleTransMax + 1:<br>      3> indicate a Random Access problem to upper layers;<br>      3> if this Random Access procedure was triggered for SI request:<br>        4> consider this Random Access procedure unsuccessfully completed.<br>    2> if the Random Access procedure is not completed:<br>      3> select a random backoff time according to a uniform distribution between 0 and<br>        the PREAMBEE_BACKOFF;<br>      3> if msgATransMax is configured, and<br>        PREAMBLE_TRANSMISSION_COUNTER = msgATransMax + 1:<br>        4> set the RA_TYPE to 4-stepRA',<br>        4> if the Msg3 buffer is empty:<br>          5> obtain the MAC PDU to transmit from the MSGA buffer and store it in<br>            the Msg3 buffer;<br>        4> if the contention-free 2-step Random Access Resources have been explicitly<br>          provided by RRC:<br>          5> if Random Access Preambles group B for 2-step RA is configured; and<br>          5> if the group of Random Access Preambles has not been selected in this<br>            Random Access procedure; and<br>          5> if the transport block size associated with the contention-free 2-step<br>            Random Access Resources correspond to the transport block size of the<br>            MSGA associated with the Random Access Preambles group B of 2-step<br>            RA:<br>            6> if Random Access Preambles group B for 4-step RA is configured:<br>              7> select the Random Access Preambles group B.<br>            6> else:<br>              7> indicate a Random Access problem to upper layers.<br>          5> else:<br>            6> select the Random Access Preambles group A.<br>        4> flush HARQ buffer used for the transmission of MAC PDU in the MSGA<br>          buffer.<br>        4> perform the Random Access Resource selection procedure as specified in<br>          subclause 5.1.2.<br>      3> else:<br>        4> perform the Random Access Resource selection procedure for 2-step random<br>          access (see subclause 5.1.2a) after the backoff time.<br>The MAC entity may stop msgB-ResponseWindow once the Random Access Response reception is considered as successful. |

As mentioned above, in some example embodiments, a result of the comparison of the TB sizes may be used for selection between CFRA and CBRA, for example, when the CFRA is allowed to be performed. In such example embodiments, if the first device 110 has performed a CBRA attempt based on the first group of preambles for the first RA type (due to the unavailability of a beam with an allocated CFRA resource) and the CBRA attempt fails, and if the beam with the allocated CFRA resource becomes available for transmission, the first device 110 may decide to compare the target TB size corresponding to the allocated CFRA resource with the first TB size configured for the first group of preambles at 230 in the signaling flow 200. If the target TB size mismatches with the first TB size, the first device 110 may not perform a CFRA attempt using the CFRA resource because the size of the buffered blocks in the first device 110 does not match with the target TB size even through the corresponding CFRA resource can be utilized based on the beam availability (beam may be a synchronization signal block (SSB) beam or channel state information reference signal (CSI-RS) beam). The first device 110 may be restricted to CBRA in the subsequent RA procedure. The first device 110 may instead continue to perform a further CBRA attempt with the first RA type based on the first group of preambles and the first TB size, for example, by transmitting a preamble selected from the first group of preambles and payload of the first TB size to the second device 120.

The first group of preambles in this case may be selected for use according to the selection methods based on the preconfigured parameters, instead of based on comparing the TB sizes configured for the available groups of preambles with the target TB size. The first group of preambles may be one of Random Access Preambles group A and Random Access Preambles group B for the first RA type. For example, for the quick RA type, the potential payload size in MSGA (UL data available for transmission plus MAC header and, where required, MAC CEs) is greater than ra-MsgASizeGroupA and the pathloss is less than PCMAX (of the Serving Cell performing the Random Access Procedure)—preambleReceivedTargetPower—msgA-DeltaPreamble—messagePowerOffsetGroupB, or if Random Access procedure was initiated for the CCCH logical channel and the CCCH SDU size plus MAC subheader is greater than ra-MsgASizeGroupA, the Random Access Preambles group B is selected. Otherwise, the Random Access Preambles group A is selected.

Figure 3:
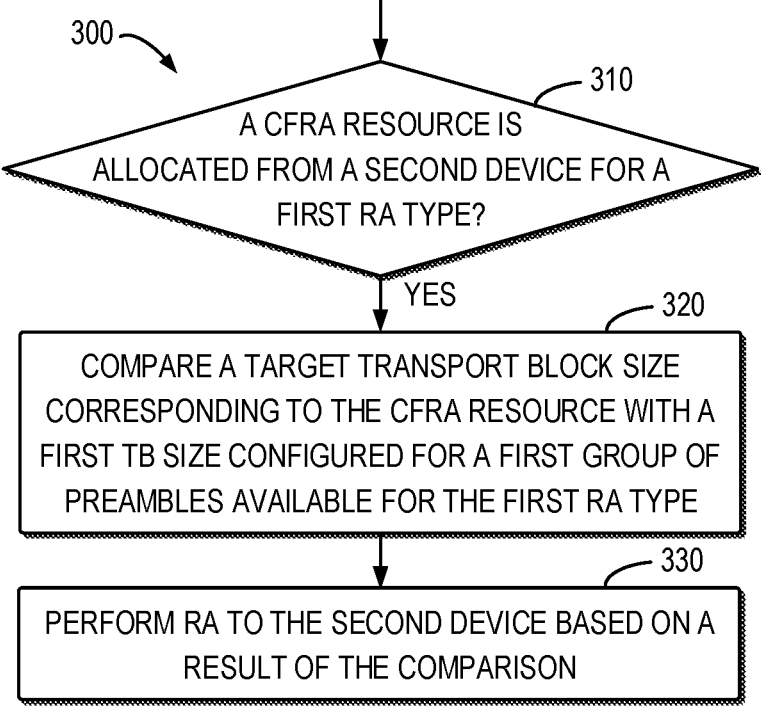
FIG. 3 illustrates a flowchart of a method implemented at a first device according to some example embodiments of the present disclosure.

FIG. 3 shows a flowchart of an example method 300 implemented at a first device in accordance with some example embodiments of the present disclosure. For the purpose of discussion, the method 300 will be described from the perspective of the first device 110 with reference to FIG. 1.

At block 310, the first device 110 determines whether a contention-free random access resource is allocated from a second device for a first random access type. In accordance with a determination that the contention-free random access resource is allocated, at block 320, the first device 110 compares a target transport block size corresponding to the contention-free random access resource with a first transport block size configured for a first group of preambles available for the first random access type. At block 330, the first device 110 performs random access to the second device based on a result of the comparison.

In some example embodiments, performing the random access comprises in accordance with a determination that the target transport block size matches with the first transport block size, performing the random access based on the first group of preambles.

In some example embodiments, performing the random access based on the first group of preambles comprises: in accordance with a determination that the first random access type is used, performing a contention-based random access attempt with the first random access type by transmitting a preamble selected from the first group of preambles and payload of the first transport block size.

In some example embodiments, performing the random access based on the first group of preambles comprises: in accordance with a trigger of switching from the first random access type to a second random access type, selecting a second group of preambles for the second random access type corresponding to the first group of preambles; and in accordance with a selection of the second group of preambles, performing a further contention-based random access attempt with the second random access type by transmitting a preamble selected from the second group of preambles.

In some example embodiments, selecting the second group of preambles comprises: in accordance with a trigger of switching from the first random access type to a second random access type, determining whether the second group of preambles is available for the first device; and in accordance with a determination that the second group of preambles is available, selecting the second group of preambles. In some example embodiments, the method further comprises in accordance with a determination that the second group of preambles is unavailable, determine that the random access fails, without performing a contention-based random access attempt with the second random access type.

In some example embodiments, the second random access type is a slow random access type. In some example embodiments, the second random access type is a four-step random access type.

In some example embodiments, comparing the target transport block size with the first transport block size comprises: determining whether transmission on the contention-free random access resource is available, and in accordance with a determination that the transmission on the contention-free random access resource is unavailable, comparing the target transport block size with the first transport block size.

In some example embodiments, performing the random access comprises in accordance with a determination that the target transport block size mismatches with the first transport block size, performing the random access based on a third group of preambles available for the first random access type.

In some example embodiments, the third group of preambles comprises one of Random Access Preambles group A and Random Access Preambles group B for the first random access type.

In some example embodiments, comparing the target transport block size with the first transport block size comprises: in accordance with a determination that a previous contention-based random access attempt using a preamble selected from the first group of preambles fails, determining whether transmission on the contention-free random access resource is available, and in accordance with the transmission on the contention-free random access resource is available, comparing the target transport block size with the first transport block size.

In some example embodiments, comparing the target transport block size with the first transport block size comprises determining whether a previous contention-based random access attempt to the second device is performed, and in accordance with a determination that the previous contention-based random access attempt has not been performed, comparing the target transport block size with the first transport block size.

In some example embodiments, performing the random access comprises: in accordance with a determination that the target transport block size mismatches with the first transport block size, preventing a contention-free random access attempt from being performed.

In some example embodiments, performing the random access comprises: in accordance with a determination that the target transport block size mismatches with the first transport block size, performing a further contention-based random access attempt with the first random access type based on the first group of preambles and the first transport block size.

In some example embodiments, the first group of preambles comprises one of Random Access Preambles group A and Random Access Preambles group B for the first random access type.

In some example embodiments, the first random access type is a quick random access type. In some example embodiments, the first random access type is a two-step random access type.

In some example embodiments, the first device comprises a terminal device, and the second device comprises a network device.

In some example embodiments, a first apparatus capable of performing any of the method 300 (for example, the first device 110) may comprise means for performing the respective steps of the method 300. The means may be implemented in any suitable form. For example, the means may be implemented in a circuitry or software module. The first apparatus may be implemented as or included in the first device 110.

In some example embodiments, the first apparatus comprises means for determining whether a contention-free random access resource is allocated from a second apparatus for a first random access type; in accordance with a determination that the contention-free random access resource is allocated, comparing a target transport block size corresponding to the contention-free random access resource with a first transport block size configured for a first group of preambles available for the first random access type; and performing random access to the second apparatus based on a result of the comparison.

In some example embodiments, the means for performing the random access comprises means for, in accordance with a determination that the target transport block size matches with the first transport block size, performing the random access based on the first group of preambles.

In some example embodiments, the means for performing the random access based on the first group of preambles comprises: means for, in accordance with a determination that the first random access type is used, performing a contention-based random access attempt with the first random access type by transmitting a preamble selected from the first group of preambles and payload of the first transport block size.

In some example embodiments, the means for performing the random access based on the first group of preambles comprises: means for, in accordance with a trigger of switching from the first random access type to a second random access type, selecting a second group of preambles for the second random access type corresponding to the first group of preambles; and in accordance with a selection of the second group of preambles, performing a further contention-based random access attempt with the second random access type by transmitting a preamble selected from the second group of preambles.

In some example embodiments, the means for selecting the second group of preambles comprises: means for, in accordance with a trigger of switching from the first random access type to a second random access type, determining whether the second group of preambles is available for the first device; and in accordance with a determination that the second group of preambles is available, selecting the second group of preambles. In some example embodiments, the method further comprises in accordance with a determination that the second group of preambles is unavailable, determine that the random access fails, without performing a contention-based random access attempt with the second random access type.

In some example embodiments, the second random access type is a slow random access type. In some example embodiments, the second random access type is a four-step random access type.

In some example embodiments, the means for comparing the target transport block size with the first transport block size comprises: means for determining whether transmission on the contention-free random access resource is available, and means for, in accordance with a determination that the transmission on the contention-free random access resource is unavailable, comparing the target transport block size with the first transport block size.

In some example embodiments, comparing the target transport block size with the first transport block size comprises determining whether a previous contention-based random access attempt to the second device is performed, and in accordance with a determination that the previous contention-based random access attempt has not been performed, comparing the target transport block size with the first transport block size.

In some example embodiments, the means for performing the random access comprises means for, in accordance with a determination that the target transport block size mismatches with the first transport block size, performing the random access based on a third group of preambles available for the first random access type.

In some example embodiments, the third group of preambles comprises one of Random Access Preambles group A and Random Access Preambles group B for the first random access type.

In some example embodiments, the means for comparing the target transport block size with the first transport block size comprises: means for, in accordance with a determination that a previous contention-based random access attempt using a preamble selected from the first group of preambles fails, determining whether transmission on the contention-free random access resource is available, and in accordance with the transmission on the contention-free random access resource is available, comparing the target transport block size with the first transport block size.

In some example embodiments, the means for performing the random access comprises: means for, in accordance with a determination that the target transport block size mismatches with the first transport block size, preventing a contention-free random access attempt from being performed.

In some example embodiments, the means for performing the random access comprises: means for, in accordance with a determination that the target transport block size mismatches with the first transport block size, performing a further contention-based random access attempt with the first random access type based on the first group of preambles and the first transport block size.

In some example embodiments, the first group of preambles comprises one of Random Access Preambles group A and Random Access Preambles group B for the first random access type.

In some example embodiments, the first random access type is a quick random access type. In some example embodiments, the first random access type is a two-step random access type.

In some example embodiments, the first apparatus comprises a terminal device, and the second apparatus comprises a network device.

In some example embodiments, the first apparatus further comprises means for performing other steps in some example embodiments of the method 300. In some example embodiments, the means comprises at least one processor; and at least one memory including computer program code, the at least one memory and computer program code configured to, with the at least one processor, cause the performance of the first apparatus.

Figure 4:
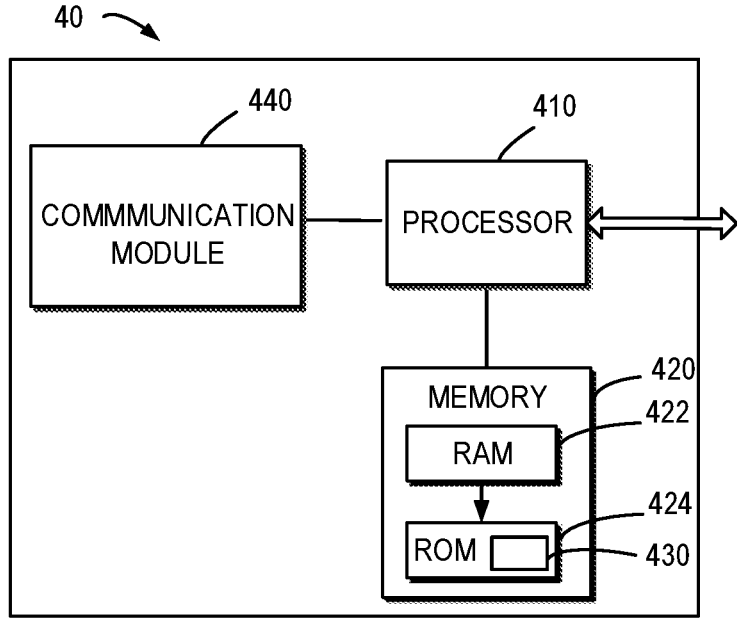
FIG. 4 illustrates a simplified block diagram of an apparatus that is suitable for implementing example embodiments of the present disclosure.

FIG. 4 is a simplified block diagram of a device 400 that is suitable for implementing example embodiments of the present disclosure. The device 400 may be provided to implement the communication device, for example the first device 110 or the second device 120 as shown in FIG. 1. As shown, the device 400 includes one or more processors 410, one or more memories 420 coupled to the processor 410, and one or more communication modules 440 coupled to the processor 410.

The communication module 440 is for bidirectional communications. The communication module 440 has at least one antenna to facilitate communication. The communication interface may represent any interface that is necessary for communication with other network elements.

The processor 410 may be of any type suitable to the local technical network and may include one or more of the following: general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may include one or more non-volatile memories and one or more volatile memories. Examples of the non-volatile memories include, but are not limited to, a Read Only Memory (ROM) 424, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 422 and other volatile memories that will not last in the power-down duration.

A computer program 430 includes computer executable instructions that are executed by the associated processor 410. The program 430 may be stored in the memory, e.g., ROM 424. The processor 410 may perform any suitable actions and processing by loading the program 430 into the RAM 422.

The example embodiments of the present disclosure may be implemented by means of the program 430 so that the device 400 may perform any process of the disclosure as discussed with reference to FIGS. 2 to 3. The example embodiments of the present disclosure may also be implemented by hardware or by a combination of software and hardware.

Figure 5:
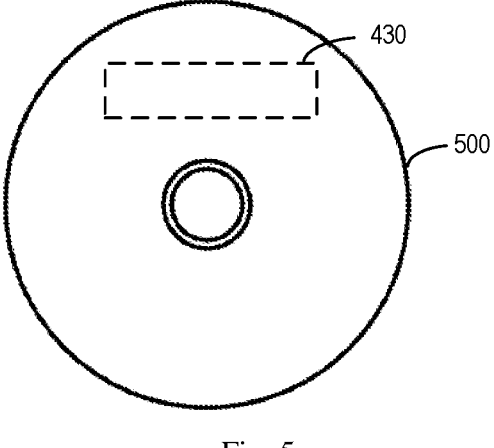
FIG. 5 illustrates a block diagram of an example computer readable medium in accordance with some example embodiments of the present disclosure.

In some example embodiments, the program 430 may be tangibly contained in a computer readable medium which may be included in the device 400 (such as in the memory 420) or other storage devices that are accessible by the device 400. The device 400 may load the program 430 from the computer readable medium to the RAM 422 for execution. The computer readable medium may include any types of tangible non-volatile storage, such as ROM, EPROM, a flash memory, a hard disk, CD, DVD, and the like. FIG. 5 shows an example of the computer readable medium 500 in form of CD or DVD. The computer readable medium has the program 430 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out any of the methods as described above with reference to FIGS. 2 to 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A user equipment comprising:
at least one processor; and
at least one memory comprising instructions stored thereon that, when executed by the at least one processor, cause the user equipment to perform at least:
selecting, for two-step contention-based random access, a preamble group of a plurality of preamble groups configured for the user equipment,
wherein, in a case that a resource for a two-step contention-free random access is configured for the user equipment, the preamble group is selected based on whether a first transport block size indicating a size of payload that can be transmitted using the resource for the two-step contention-free random access corresponds to a second transport block size configured for the preamble group being selected; and
transmitting a two-step contention-based random access message to a network device,
the two-step contention-based random access message comprising a preamble from the selected preamble group and a payload of the second transport block size.

2. The user equipment according to claim 1, wherein the instructions stored in the at least one memory, when executed by the at least one processor, further cause the user equipment to perform:

switching to four-step contention-based random access in a case that the two-step contention-based random access is not successfully completed after transmitting the two-step contention-based random access message.

3. The user equipment according to claim 2, wherein the instructions stored in the at least one memory, when executed by the at least one processor, further cause the user equipment to perform the switching to the four-step contention-based random access after performing a number of random access attempts.

4. The user equipment according to claim 3, wherein the number of random access attempts comprises a number of two-step contention-free random access attempts or a number of two-step contention-based random access attempts.

5. The user equipment according to claim 2, wherein the instructions, when executed by the at least one processor, cause the user equipment to perform a random access attempt, after switching to the four-step contention-based random access, based on said selection of the preamble group for the two-step contention-based random access.

6. The user equipment according to claim 1, wherein the plurality of preamble groups includes at least a preamble group A and a preamble group B, and wherein the instructions stored in the at least one memory, when executed by the at least one processor, further cause the user equipment to perform:
selecting the preamble group B if the first transport block size corresponds to the second transport block size.

7. The user equipment according to claim 6, wherein the instructions stored in the at least one memory, when executed by the at least one processor, further cause the user equipment to perform:
selecting the preamble group A if the first transport block size does not correspond to the second transport block size.

8. A method performed by a user equipment, the method comprising:
selecting, for two-step contention-based random access, a preamble group of a plurality of preamble groups configured for the user equipment,
wherein, in a case that a resource for a two-step contention-free random access is configured for the user equipment, the preamble group is selected based on whether a first transport block size indicating a size of payload that can be transmitted using the resource for the two-step contention-free random access corresponds to a second transport block size configured for the preamble group being selected; and
transmitting a two-step contention-based random access message to a network device,
the two-step contention-based random access message comprising a preamble from the selected preamble group and a payload of the second transport block size.

9. The method according to claim 8, further comprising:
switching to four-step contention-based random access in a case that the two-step contention-based random access is not successfully completed after transmitting the two-step contention-based random access message.

10. The method according to claim 9, wherein the switching to the four-step contention-based random access is carried out after performing a number of random access attempts.

11. The method according to claim 10, wherein the number of random access attempts comprises a number of two-step contention-free random access attempts or a number of two-step contention-based random access attempts.

12. The method according to claim 9, further comprising:

performing a random access attempt, after switching to the four-step contention-based random access, based on said selection of the preamble group for the two-step contention-based random access.

13. The method according to claim 8, wherein the plurality of preamble groups includes at least a preamble group A and a preamble group B, and wherein the method further comprises:

selecting the preamble group B if the first transport block size corresponds to the second transport block size.

14. The method according to claim 13, further comprising:

selecting the preamble group A if the first transport block size does not correspond to the second transport block size.

15. A non-transitory computer-readable storage medium comprising instruction stored therein that, when executed by at least one processor of a user equipment, cause the user equipment to perform at least:

selecting, for two-step contention-based random access, a preamble group of a plurality of preamble groups configured for the user equipment, wherein, in a case that a resource for a two-step contention-free random access is configured for the user equipment, the preamble group is selected based on whether a first transport block size indicating a size of payload that can be transmitted using the resource for the two-step contention-free random access corresponds to a second transport block size configured for the preamble group being selected; and transmitting a two-step contention-based random access message to a network device, the two-step contention-based random access message comprising a preamble from the selected preamble group and a payload of the second transport block size.

16. The non-transitory computer-readable storage medium according to claim 15, wherein the instructions stored therein are further configured, when executed by the at least one processor of the user equipment, further cause the user equipment to perform:

switching to four-step contention-based random access in a case that the two-step contention-based random access is not successfully completed after transmitting the two-step contention-based random access message.

17. The non-transitory computer-readable storage medium according to claim 16, wherein the switching to the four-step contention-based random access is carried out after performing a number of random access attempts.

18. The non-transitory computer-readable storage medium according to claim 17, wherein the number of random access attempts comprises a number of two-step contention-free random access attempts or a number of two-step contention-based random access attempts.

19. The non-transitory computer-readable storage medium according to claim 17, wherein the instructions stored therein are further configured, when executed by the at least one processor of the user equipment, further cause the user equipment to perform:

performing a random access attempt, after switching to the four-step contention-based random access, based on said selection of the preamble group for the two-step contention-based random access.

20. The non-transitory computer-readable storage medium according to claim 15, wherein the plurality of preamble groups includes at least a preamble group A and a preamble group B, and wherein the instructions stored therein are further configured, when executed by the at least one processor of the user equipment, further cause the user equipment to perform:

selecting the preamble group B if the first transport block size corresponds to the second transport block size; or selecting the preamble group A if the first transport block size does not correspond to the second transport block size.

* * * * *